Sept. 12, 1933. W. H. VE RELLE Re. 18,949

TIE

Original Filed Nov. 25, 1931

INVENTOR
William H. Ve Relle
By W. W. Williamson
Atty.

Reissued Sept. 12, 1933

Re. 18,949

UNITED STATES PATENT OFFICE 18,949

TIE

William H. Ve Relle, Philadelphia, Pa.

Original No. 1,864,265, dated June 21, 1932, Serial No. 577,322, November 25, 1931. Application for reissue May 13, 1933. Serial No. 670,890

2 Claims. (Cl. 2—150)

This invention relates to a necktie, the general object of the invention being to provide a tie which can be easily and quickly put in place and removed and one which will not wrinkle and one in which the knot can be made in various sizes.

This invention also consists in certain other features of construction and in the combination and arrangement of the several parts to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:—

Figure 5:
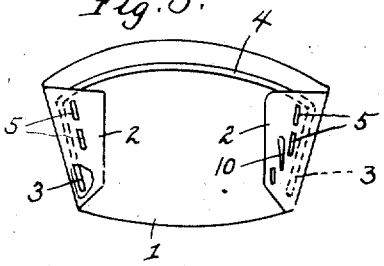
Fig. 5 is a view of the member which forms the knot and which is covered by portions of the necktie, a section being broken out to show one of the wire ends.

As shown in the drawing, I provide a member 1 of heavy fabric or the like which is of the shape shown in Fig. 5 and has its ends 2 turned over the bent ends 3 of a strip of wire 4 which extends across the inner face of the member 1 a slight distance below the upper edge of the same. The ends 2 can be stitched to the member 1 though the drawing shows these ends 2 attached to the body part of the member 1 by the staples 5. Thus the member 1 can be bent into substantially loop or tapered cylindrical shape and the wire 4 will retain it in the shape to which it is bent.

Figure 2:
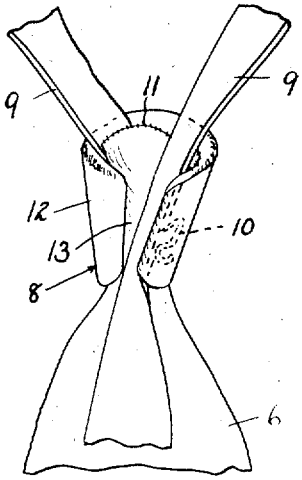
Fig. 2 is a rear view.
Figure 3:
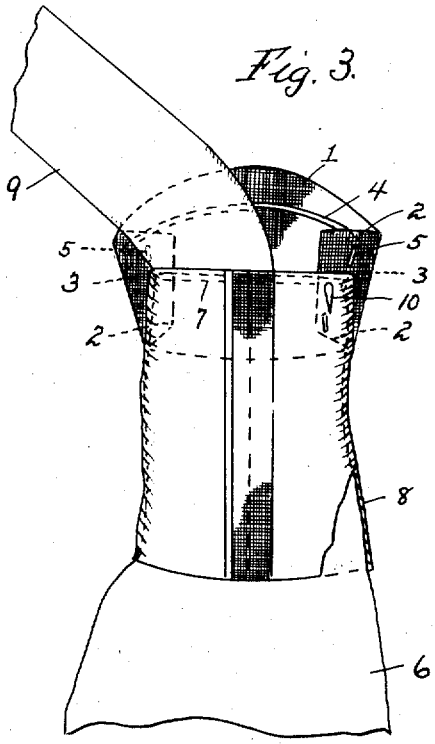
Fig. 3 is a rear view showing how the knot part is constructed.
Figure 1:
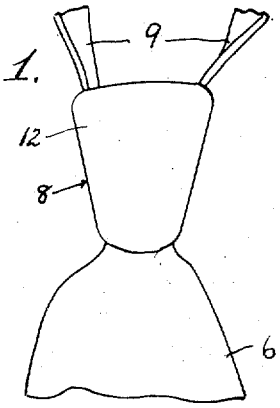
Fig. 1 is a fragmentary front view of the improved tie.
Figure 4:
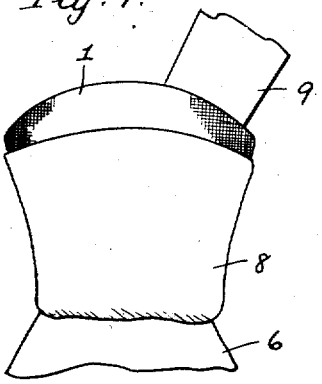
Fig. 4 is a view with the covering portion of the knot shown in partly raised position.

The body part 6 of the necktie is folded at its upper portion and the edges of the folded part sewn together to form a tubular part 8. This tubular part is then turned inside out and its upper end sewn to the inner face of the member 1 as shown at 7 in Figure 3 and one end of a strip 9, of the same material as the body 6, is also sewn to the member 1 by this same stitching 7. Then the tubular part 8 is brought up over the member 1 in the manner shown in Figure 4, and its free end passed over the upper edge of the member 1 and sewn by stitches 11 to other portions of the tubular part within the space formed by the member 1 as shown in Figure 2. The parts are so arranged and sewn together that the strip 9 passes at an angle from the top part of the knot forming portion composed of the member 1 covered by the tubular part 8 of the body of the necktie. Said knot forming portion is now bent into loop or tapered cylindrical shape as shown in Fig. 2 to produce the knot 12 which in a front view as shown in Fig. 1 resembles the usual knot in a four-in-hand tie, and while this knot is hollow the adjacent ends of the knot forming portion are slightly spaced apart forming a longitudinal slot 13 in the back of the knot which acts as an entrance to the interior of said knot, and this slot is preferably wider at its upper end than at its lower end as plainly shown in Fig. 2. The entrance 13 permits a free portion of the portion of the strip or neckband 9 to be passed edgewise or sidewise through the entrance 13 into the hollow knot 12. The tie is then adjusted to place the knot forming portion at the front of the collar in the usual manner.

Figure 6:
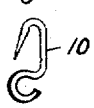
Fig. 6 is a view of the point carrying member.

A member 10 is carried by one of the ends 2 of the member 1 and includes an eye part and a point as shown in Fig. 6, the point extending downwardly to engage a part of the strip or neckband 9 to hold the latter relative to the knot in adjusted position, and to prevent slipping of said knot relative to said strip or neckband. When the strip or neckband 9 is being pulled from the knot, it is first pulled in the direction which tends to tighten the same about a wearer's neck or a collar which action will cause the strip 9 to engage the eye part of the member 10 and throw the point of said member to one side so that the point is disengaged from the strip 9, and the latter can then be withdrawn from the knot.

In using the device, the knot portion of the necktie is placed at the left side of the collar and the strip or neckband 9 is passed around the collar. The knot is then slightly tilted and also slightly rotated to give access to the upper wide end of the entrance 13 so that the strip or neckband 9 may be inserted sidewise or edgewise into the knot through the entrance after which the knot is slid upwardly and placed in the desired position at the front of the collar. During the upward movement of the knot, the latter is turned slightly to the right so that the pin of the member 10 will engage a part of the said strip or neckband 9 and be caused to penetrate said strip 9 to hold the parts in adjusted position.

To remove the tie, the hand is placed on the knot at the upper part and said knot twisted slightly to the left and moved upwardly so as to disengage the pin of member 10 from the strip 9, or the knot can be held with the left hand and the strip 9 pulled downwardly to release the pin of member 10 from said strip 9 after which the parts can be disconnected by withdrawing the strip or neckband 9 through the entrance slot 13 permitting the tie to be easily removed from the collar.

It is thought from the foregoing description that the advantages and novel features of the invention will be apparent.

It is to be understood that changes may be made in the construction and in the combination and arrangement of the several parts provided that such changes fall within the scope of the appended claims.

Having thus fully described my invention, what I claim as new and useful is:—

1. A necktie comprising a member of flexible material, a wire extending across the upper part of the member and having its ends bent downwardly, the ends of the member being bent over the bent ends of the wire and fastened thereto, a tie part having a tubular part having a portion sewn to the inner face of the said member with said tubular part enclosing the member, a strip forming the small part of the tie, having one end fastened to the inner face of the member and adapted to pass around the neck and then through the knot forming part formed by the member, and a pin in the knot part for holding the strip therein.

2. A necktie comprising a bendable member of tapered cylindrical form having a longitudinal slot at the rear thereof, a tubular body part covering said bendable member with edges meeting on the inner face of said bendable member and secured together, a second body part depending from said bendable member, and a neckband strip having one end secured to said bendable member with the other end for sidewise passage through the longitudinal slot.

WILLIAM H. VE RELLE.